United States Patent [19]

Mally

[11] 3,962,170

[45] June 8, 1976

[54] FLAME RESISTANT VINYLIDENE CHLORIDE COPOLYMER LATICES AND ARTICLES MADE THEREFROM

[75] Inventor: Adolf Antony Mally, Kinross, Scotland

[73] Assignee: The Goodyear Tire & Rubber Company, Akron, Ohio

[22] Filed: Oct. 16, 1974

[21] Appl. No.: 515,386

[30] Foreign Application Priority Data

Oct. 30, 1973 United Kingdom ............ 50473/73

[52] U.S. Cl. ..................... 260/29.7 H; 260/29.7 P; 260/29.7 N; 260/45.7 P; 260/45.9 R; 260/DIG. 24; 526/317; 526/340; 526/338; 526/334

[51] Int. Cl.² ........................ C08K 3/28; C08K 5/52

[58] Field of Search ................. 260/28.5 B, 28.5 D, 260/29.7 H, 29.7 T, 29.7 P, 29.7 N, 80.7, DIG. 24

[56] References Cited

UNITED STATES PATENTS

| | | | |
|---|---|---|---|
| 2,380,356 | 7/1945 | Youker | 260/80.7 |
| 2,463,574 | 3/1949 | Stanton | 260/80.7 |
| 3,639,298 | 2/1972 | Lister | 260/28.5 B |
| 3,766,189 | 10/1973 | Blackford | 260/28.5 B |
| 3,792,007 | 2/1974 | Gleason | 260/29.7 P |
| 3,840,488 | 10/1974 | Steinwand | 260/29.7 P |

FOREIGN PATENTS OR APPLICATIONS 1,105,266 3/1968 United Kingdom

*Primary Examiner*—Paul R. Michl
*Attorney, Agent, or Firm*—J. Y. Clowney

[57] ABSTRACT

Latex compositions comprising carboxylated styrene-butadiene-vinylidene chloride copolymer latices wherein the latex consists essentially of 15 to 45% styrene, 25 to 50% butadiene, 25 to 40% vinylidene chloride and 0.5 to 10% copolymerizable carboxylic acid and a flame retardant additive exhibit improved flame retardant properties for use in carpet and floor covering applications.

4 Claims, No Drawings

FLAME RESISTANT VINYLIDENE CHLORIDE COPOLYMER LATICES AND ARTICLES MADE THEREFROM

BACKGROUND AND SUMMARY OF THE INVENTION

This invention relates to flame resistant latex compositions. More particularly, this invention relates to latex compositions comprising carboxylated styrene-butadiene-vinylidene chloride latices and a flame retardant additive, and to carpet and textile constructions coated, impregnated or laminated with these latex compositions.

Carboxylated styrene-butadiene latices find wide use in coating applications and as binders, adhesives, sizing, and backing in the construction of carpeting and floor coverings. The attractive properties of these materials, in particular the ease of compounding and rapidity with which they may be applied and processed, have contributed greatly to the wide acceptance of these systems. Additionally, these materials accept high levels of loading and may be formulated to emphasize abrasion resistance, insensitivity to moisture and biological attack, aging properties and adhesion in the finished structure. These latices may be made to be film forming at either ambient or elevated temperatures as the particular end use may require. Carboxylated styrene-butadiene polymers are inherently flammable, however, and are less than satisfactory for a great many commercial applications requiring flame resistant properties. Techniques for accomplishing the necessary reduction in flammability are well known, and the inclusion of chlorine or phosphorus containing compounds, often with a synergist such as antimony oxide, is widely practiced. Alternatively, high levels of inorganic fillers such as hydrated alumina have been incorporated in these latices to reduce susceptability to burning, often with the further addition of flame retardant compounds. In some instances, imparting flame resistance has been attempted by substituting a polyvinylchloride latex for a portion of the carboxylated styrene-butadiene latex, again normally with the inclusion of flame retardants and synergists in the composition. These approaches have not been completely satisfactory, however, in part because the flame retardant compounds employed are often expensive, and at the high levels often employed make the resulting latices considerably more costly to use. Further, many of these additions have a deleterious effect on the properties of the final product, for example, by decreasing flexibility and thereby increasing susceptability to cracking. Many of the flame retardant additives are subject to leaching and loss either during processing or subsequent use, and where high loading levels are employed, the ability to incorporate other necessary additives such as pigments, foaming agents and processing aids is severly restricted.

There is clearly a need for materials in latex form which can be formulated to give more highly flame resistant products without loss of the highly desirable processability and physical property features of carboxylated styrene-butadiene latices, and at a significant improvement in cost. To be of widest commercial acceptance, the base polymer employed should also be capable of sufficient structural variation to permit adjustment of such physical properties as hardness, flexibility and the like to meet the needs of a wide variety of end use applications.

It has now been found that latex compositions prepared by the emulsion polymerization of styrene, butadiene, vinylidene chloride and a suitable carboxylic acid monomer, are more resistant to flame in the finished form than conventional carboxylated styrene-butadiene polymers when compared by standard test methods and, when compounded with certain flame retardant additives, are markedly more resistant to flame. The latices of this invention exhibit the highly desirable processing and compounding characteristics attributed to conventional carboxylated styrene-butadiene latex systems, and can be varied in resulting physical properties from soft and rubbery to a less flexible character to suit particular end uses.

The particular polymers useful in the preparation of latices employed for purposes of this invention are those prepared by the emulsion polymerization of a monomer mixture containing from about 15% to about 45% by weight styrene, from about 25% to about 50% by weight butadiene, from about 25% to about 40% by weight vinylidene chloride and from about 1.0% to about 2.5% of a copolymerizable carboxylic acid.

The particular amounts of each monomer employed will depend somewhat upon the end-use envisioned. A minimum level of vinylidene chloride is necessary to impart good flame resistance to the resulting product, however, and it is essential that polymers contain greater than about 17% bound chlorine, corresponding to a 25% by weight level of vinylidene chloride incorporation, for good flame resistant characteristics. The more preferable compositions have incorporated at least 27% by weight vinylidene chloride, corresponding to 20% bound chlorine in the final polymer. Although further increases in vinylidene chloride level appear to impart a further flame retardant effect, the stiffness of the resulting product is also increased and at monomer levels above about 45% by weight the products are generally too non-resilient and stiff for most latex application.

The ratio of styrene and butadiene employed similarly affects hardness, rubbery character and tear strength of the resulting product, with low styrene, high butadiene compositions generally exhibiting a soft rubbery character while higher styrene systems are harder and more abrasion resistant. The precise levels to be employed are necessarily adjusted to account for the level of vinylidene chloride employed, and it has been found that at any level of styrene and vinylidene chloride, mixtures containing less than about 25% butadiene result in products too rigid and inflexible to be generally useful in latex applications, while products from compositions having greater than about 50% butadiene generally are too soft.

The carboxylic acid monomer may be any of the ethylenically unsaturated carboxylic acids commonly employed in the preparation of carboxylated styrene-butadiene latices, such as acrylic acid, methacrylic acid, cinnamic acid, crationic acid, itaconic acid, citraconic acid or maleic acid. Preferably, itaconic acid will be employed. The incorporation of small amounts, preferably from 0.5 to 10% by weight more preferably from 1.0 to about 2.5% by weight of a carboxylic acid in the monomer mixture imparts stability to the resulting latex and improves such product properties as adhesion and clarity.

The latices employed in the practice of this invention are preferably prepared by conventional emulsion polymerization methods although it is entirely conceivable that polymers of similar structure and composition might be prepared by other methods and subsequently converted to a latex form. Since the preferred emulsion process results directly in a suitable latex, it is therefore most practical and convenient.

The latices are futher compounded with a flame retardant additive. A great number of flame retardant additives are known to be useful in conventional carboxylated styrene-butadiene latex compositions and it is likely that most would impart at least some added flame resistance to the latices of this invention. It has now been found to be particularly advantageous to employ certain bromine compounds with carboxylated styrene-butadiene-vinylidene chloride latices. In particular, a bromine compound such as ammonium bromide or tris dibromopropyl phosphate, when incorporated into the latex at levels about 10 parts per hundred parts by weight of the latex on a dry solids basis, more preferably at a level above 30 parts per hundred and still more preferably at levels between about 30 parts by weight and about 60 parts by weight per hundred parts by weight of latex on a dry solids basis impart markedly improved flame resistance to finished products. These bromine compounds may be added to the latex upon completion of the polymerization step if water soluble, or during any later compounding step prior to use.

This invention will be more clearly understood as demonstrated by the following preparative examples and comparative tests, wherein typical latex compositions are prepared and tested to demonstrate the remarkable flame resistant characteristics of materials embraced within the scope of this invention. It should be understood that the particular preparative techniques are adapted for laboratory preparative use, and are not to be regarded as limiting the scope of the invention.

LATEX PREPARATION

EXAMPLE 1

A charge of the following chemicals was sealed in a glass bottle:

|   | Grams |   |
|---|---|---|
| Demineralized water, pH, adjusted to 2 with HCl | 111.3 |   |
| Sodium linear alkylate sulfonate 20% | 17 |   |
| Diester of sodium sulfosuccinic acid, 20% | 8 |   |
| Sodium hydroxyethylene-diaminetriacetate, 48% | 0.4 |   |
| Sodium pyrophosphate, 5% | 20 |   |
| Potassium persulfate, 5% | 20 |   |
| Mixed tertiary mercaptans | 0.3 |   |
| Vinylidene chloride | 41 | (20.5%) |
| Styrene | 67 | (33.5%) |
| Butadiene, 1,3 | 90 | (45%) |
| Itaconic acid, 5% | 40 | (1%) |

The bottle was heated with tumbling of the bottle end over end in a water bath maintained at 130°F. for a period of five hours after which the temperature was raised to 160°F. and maintained for a period of 10½ hours, then the bath was cooled to room temperature, the bottle was removed and opened. The product ws a latex. The conversion of the monomers to polymer was 93.66 percent based on the monomers initially charged.

EXAMPLE 2

A charge of the following chemicals was sealed in a glass bottle:

|   | Grams |   |
|---|---|---|
| Demineralized water, pH Adjusted to 2 with HCl | 111.3 |   |
| Sodium linear alkylate sulfonate, 20% | 17 |   |
| Diester of sodium sulfosuccinic acid, 20% | 8 |   |
| Sodium hydroxyethylene-diaminetriacetate, 48% | 0.4 |   |
| Sodium pyrophosphate, 5% | 20 |   |
| Potassium persulfate, 5% | 20 |   |
| Mixed tertiary mercaptans | 0.3 |   |
| Vinylidene chloride | 68.2 | (34.1%) |
| Styrene | 39.8 | (19.9%) |
| Butadiene, 1,3 | 90 | (45%) |
| Itaconic acid, 5% | 40 | (1%) |

The sealed bottle was heated with tumbling of the bottle end over end in a water bath maintained at 130°F. for a period of five hours after which the temperature was raised to 160°F. and maintained for a period of 9½ hours when 4 gm of 5% solution of potassium persulfate was added to bottle with aid of a hypodermic syringe and the contents were allowed to react at 160°F. for four more hours and then the bath was cooled to room temperature. The conversion of the monomers to polymer was 89.3 percent based on the initial charge of the monomers.

EXAMPLE 3

A charge of the following chemicals was sealed in a glass bottle:

|   | Grams |   |
|---|---|---|
| Demineralized water, pH adjusted to 2 with HCl | 111.14 |   |
| Sodium linear alkylate sulfonate, 20% | 17.0 |   |
| Diester of sodium sulfosuccinic acid, 20% | 8.0 |   |
| Sodium hydroxyethlenediamine-triacetate, 48% | 4.0 |   |
| Sodium pyrophosphate, 5% | 20.0 |   |
| Potassium persulfate, 5% | 20.0 |   |
| Mixed tertiary mercaptans | 0.14 |   |
| Vinylidene chloride | 82.0 | (41%) |
| Styrene | 46.0 | (23%) |
| Butadiene, 1,3 | 70.0 | (35%) |
| Itaconic acid, 5% | 40.0 | (1%) |

The contents of the bottle were reacted by the procedure described in the Example 1. The conversion of the monomers to polymer was 88.3 percent based on monomers charged initially.

EXAMPLE 4

In this example, a charge of the following chemicals was made to an evacuated vessel with a jacket.

|   | Grams |
|---|---|
| Demineralized water | 92.4 |
| Sodium linear alkylate sulfonate | 1.7 |
| Diester of sodium sulfo-succinic acid | 0.8 |
| Sodium hydroxyethylene-diaminetriacetate | 0.1 |

-continued

|  | Grams |  |
|---|---|---|
| Sodium pyrophosphate | 0.5 |  |
| Mixing teritiary mercaptans | 0.1 |  |
| Vinylidene chloride | 41.0 | (41%) |
| Styrene | 23.0 | (23%) |
| Butadiene, 1,3 | 35.0 | (35%) |
| Itaconic acid | 1.0 | (1%) |

The contents were heated to 130°F. and 0.5 parts potassium persulfate dissolved in 9.5 parts demineralized water was added to the reactor. At 50% conversion of monomers to polymer, the batch temperature was raised to 160°F. At 78% conversion of monomers to polymer, 0.1 part potassium persulfate dissolved in 1.9 parts demineralized water was added to the reactor. A similar addition of potassium persulfate solution was made at 85% conversion. At about 90% conversion of monomers to polymer, the contents of the reactor were cooled down to room temperature. The resultant latex was then stripped off the unreacted volatile monomers by vacuum distillation.

EXAMPLE 5

A charge of the following chemicals was sealed in a glass bottle:

|  | Grams |  |
|---|---|---|
| Demineralized water, pH Adjusted to 2 with HCl | 111.2 |  |
| Sodium linear alkylate sulfonate, 20% | 17 |  |
| Diester of sodium sulfo-succinic acid, 20% | 8 |  |
| Sodium hydroxyethylene-diaminetriacetate, 48% | 0.4 |  |
| Sodium pyrophosphate, 5% | 20 |  |
| Potassium persulfate, 5% | 20 |  |
| Mixed tertiary mercaptans | 0.2 |  |
| Vinylidene chloride | 54.6 | (27.3%) |
| Styrene | 63.4 | (31.7%) |
| 1,3 Butadiene | 80.0 | (40%) |
| Itaconic acid, 5% | 40.0 | (1%) |

The contents of the bottle were reacted by the procedure described in Example 2. The conversion of the monomers to polymer was 88.9 percent based on the monomers charged initially.

EXAMPLE 6

A charge of the following chemicals was sealed in a glass bottle:

|  | Grams |  |
|---|---|---|
| Demineralized water, pH Adjusted to 2 with HCl | 111.3 |  |
| Sodium linear alkylate sulfonate, 20% | 17 |  |
| Diester of sodium sulfo-succinic acid, 20% | 8 |  |
| Sodium hydroxyethylene-diaminetriacetate, 48% | 0.4 |  |
| Sodium pyrophosphate, 5% | 20.0 |  |
| Potassium persulfate, 5% | 20.0 |  |
| Mixed tertiary mercaptans | 0.3 |  |
| Vinylidene chloride | 82.0 | (41%) |
| Styrene | 36.0 | (18%) |
| Butadiene, 1,3 | 80.0 | (40%) |
| Itaconic acid, 5% | 40.0 | (1%) |

The contents of the bottle were reacted by the procedure described in Example 2. The conversion of monomers to polymer was percent 84.3 based on the monomers charged initially.

EXAMPLE 7

To a stirred polymerization reactor was added 50.6 lbs. of demineralized water, 6.4 lbs. of a 25% solution of aqueous sodium dodecylbenzene sulfonate, 40.3 g. of a 90% solution of sodium poly[alkyl napthalene sulfonic acid], 75.6 g. of a 48% solution of trisodium salt of ethylene diamine tetraacetic acid 217.9 g. of tetrasodium pyrophosphate, and 363.2 g. of itaconic acid (1 wt. %). The reactor was sealed and the mixture was stirred to disperse the ingredients, and then a mixture containing 36.0 lbs. of styrene monomer (45 wt. %), 21.6 lbs. of vinylidene chloride monomer (27 wt. %) and 36.3 g. of mixed tertiary mercaptans was charged to the reactor, followed by 21.6 lbs. of 1,3-butadiene monomer (27 wt. %). The initiation solution, consisting of 435.8 g. of potassium persulfate dissolved in 18.2 lbs. of water was then added and the reaction mixture was heated to 130°F., and held four hours with stirring, then to 158°F. and held an additional 16 hours. Incremental additions of potassium persulfate solution totalling 54.5 g. of persulfate were made at 14.5 hours and 19 hours to ensure completion.

The mixture was cooled, adjusted to a pH of 10 with ammonium hydroxide, and stripped under vacuum to a final solids content of 50% by weight of the total mixture. The conversion was 90.3% based on monomers charged to the reactor. A sample of the final polymer had a bound chlorine content of 20.5% by weight on analysis.

EXAMPLE 8

Employing substantially the same procedure outlined in Example 7, a monomer mixture of 17.6 lbs. of styrene (22 wt. %), 21.6 lbs. of vinylidene chloride (27 wt. %), 363 g. of itaconic acid (1 wt. %) and 40.0 lbs. of 1,3-butadiene (50 wt. %) was polymerized. The latex after stripping had 50.8% by weight total solids, and was obtained in 90.4% conversion. On analysis, 20.5% by weight bound chlorine was found.

COMBUSTION TESTS

The latices of Examples 1–4 were compared with a commercial carboxylated styrene-butadiene latex (Marmix 23510) in a standard Limiting Oxygen Index combustion test to demonstrate improved resistance to combustion. Samples of each latex including the control were cast into films, air dried and then cured at 150°C. for three minutes in a circulating air oven. The results of the Limiting Oxygen Index test are given in tabular form in Table I.

Table I.

Limiting Oxygen Index Tests On Latex Films

| Example No. | Vinylidene Chloride Content % | LOI[1] Values %$O_2$ |
|---|---|---|
| 1 | 20.5 | 18.04 |
| 2 | 34.1 | 18.70 |
| 3 | 41.0 | 19.58 |
| 4 | 41.0 | 19.75 |
| Control[2] | 0.0 | 17.75 |

Notes:
[1]LOI value is minimum %$O_2$ which will support combustion of that specimen in an Oxygen-Nitrogen mixture.
[2]Marmix 23510 commercial carboxylated styrene-butadiene resin.

It will be seen that as the vinylidene chloride level is increased, the LOI value or level of oxygen required to support combustion is similarly increased. This increased oxygen requirement in turn reflects a lowered combustibility of the sample. Thus, it is apparent that the latices described as being useful for the practice of this invention are inherently less combustible than the widely employed carboxylated styrene-butadiene latex system.

The latex composition of Example 8 was further compounded with flame retardants, fillers and thickners for evaluation. The compositions including controls are given in the following examples, wherein all parts are by weight.

though demonstrating fair flame resistance, is also not comparable in flame resistance with the compositions of Examples 9–12 at this level of antimony oxide.

Other applications in which the flame resistant latices of this invention may be employed to great advantage include backing for tufted carpet backsizing for woven carpet, and impregnating latex for needled felt, underfelt and curled hair.

What I claim is:

1. A flame resistant composition consisting essentially of:
   A. a latex prepared from a monomer mixture of (1) 15% to 45% by weight styrene, (2) 25% to 50% by weight butadiene, (3) 25% to 40% by weight vinyli- Table II

| Formulation | Example No. | | | | | | |
|---|---|---|---|---|---|---|---|
| | 9 | 10 | 11 | 12 | 13 | 14 | 15 |
| Latex-Example 8 (dry solids) | 100 | 100 | 100 | 100 | 100 | 100 | — |
| Latex 59085[1] | — | — | — | — | — | — | 100 |
| Whiting | — | 65 | 65 | 65 | 65 | 65 | 65 |
| Titanium Dioxide | — | 1 | 1 | 1 | 1 | 1 | 1 |
| Thickner[2] | — | 60 | 60 | 60 | 60 | 60 | 60 |
| Surfactant[3] | — | 18 | 18 | 18 | 18 | 18 | 18 |
| Ammonium Bromide | 40 | 40 | — | — | — | — | — |
| Tris Dibromopropyl phosphate | — | — | 35 | 40 | — | — | — |
| Antimony Oxide | — | — | — | — | 10 | — | — |
| Burn Test Results - Hot Nut Test[4] | | | | | | | |
| Burn Time, (Sec.)(5) | 0–7 | 0–7 | 0–30 | 0 | 3–35 | 83–120 | 165–175 |
| Char Radius (min) | 17 | 16 | 17 | 15 | 17 | 20 | 25 |

Notes:
[1] Marbon 59085 Latex, a commercial carboxylated styrene-butadiene latex for backsizing
[2] Thickner Aqueous solution containing 10% by weight Solvitase GC Starch
[3] Surfactant Aqueous Solution containing 9% by weight Calgon S proprietary surfactant.
[4] British Standard Test 72/70078 (see text)
[5] Minimum and Maximum times for at least three tests.

Samples for the burn tests of Table II were prepared by hand-spreading a latex coating on the back of 10 in. squares of 8 oz/sq. yd. Axminister wool carpet at a level of 8 oz. of latex per sq. yd. After drying in an air oven at 110°C. for 20 to 30 minutes, followed by a conditioning step, the carpet samples were tested for flammability. The test, termed the Hot Nut Test, is run by heating a stainless steel hexagonal nut 15/16 inches across the flats and weighing 30 ± 2 gms. to a temperature of 900°± 20°C., then placing it upon the carpet back for 30 ± 2 sec. and noting the burn time and char radius. The test is fully described in British Standard Institution Document 72/70010, as a Draft British Standard.

It will be apparent from these tests that the flame retarded compositions given in examples 9–12 exhibit markedly better flame resistance than the commercial carboxylated styrene-butadiene latex of Example 15, and that the carboxylated styrene-butadiene-vinylidene chloride latex without flame retardant of Example 14, although better than the control, is not competitive in behavior with the latex compositions of example 9–12. The latex of Example 13 containing antimony oxide, dene chloride and (4) 0.5 to 10% copolymerizable carboxylic acid, and
   B. a flame retardant compound selected from the group consisting of ammonium bromide and tris dibromopropyl phosphate.

2. The flame resistant composition of claim 1 wherein the copolymerizable carboxylic acid is itaconic acid.

3. The flame retardant composition of claim 1 wherein the flame retardant additive (B) is present in an amount from 30 to 60 parts by weight per 100 parts of polymer latex solids.

4. A flame resistant composition consisting essentially of a latex prepared from a monomer mixture of 22% to 45% by weight styrene and correspondingly from 50% to 27% by weight 1,3-butadiene, 27% vinylidene chloride and 1% by weight itaconic acid, and from 30 to 60 parts by weight per 100 parts polymer latex solids of a flame retardant additive selected from the group ammonium bromide and tris dibromopropyl phosphate.

* * * * *